(12) United States Patent
Amit et al.

(10) Patent No.: US 11,030,828 B2
(45) Date of Patent: Jun. 8, 2021

(54) SYSTEM AND METHOD TO AUTO CREATE AIRCRAFT MAINTENANCE RECORDS BY AIRCRAFT DATA

(71) Applicant: HONEYWELL INTERNATIONAL INC., Morris Plains, NJ (US)

(72) Inventors: Kashyap Amit, Karnataka (IN); Rohini Sabnis, Karnataka (IN); Sadguni Venkataswamy, Karnataka (IN)

(73) Assignee: Honeywell International Inc., Charlotte, NC (US)

(*) Notice: Subject to any disclaimer, the term of this patent is extended or adjusted under 35 U.S.C. 154(b) by 202 days.

(21) Appl. No.: 15/928,650

(22) Filed: Mar. 22, 2018

(65) Prior Publication Data

US 2019/0295331 A1   Sep. 26, 2019

(51) Int. Cl.
*G07C 5/00* (2006.01)
*G06F 16/25* (2019.01)
(Continued)

(52) U.S. Cl.
CPC ........... *G07C 5/008* (2013.01); *G06F 16/248* (2019.01); *G06F 16/25* (2019.01); *G06Q 10/06* (2013.01);
(Continued)

(58) Field of Classification Search
CPC ........ G07C 5/008; G07C 5/08; G07C 5/0808; G07C 5/085; G06F 16/25; G06F 16/248; G06Q 10/06
See application file for complete search history.

(56) References Cited

U.S. PATENT DOCUMENTS

| 4,943,919 A * | 7/1990 | Aslin | G07C 5/006 |
| | | | 340/500 |
| 6,418,361 B2 | 7/2002 | Sinex | |

(Continued)

FOREIGN PATENT DOCUMENTS

WO    2012172320 A1    12/2012

OTHER PUBLICATIONS

Perspective on Aviation Regulations Affecting Troubleshooting Guidance; White Paper No. 171025, CaseBank Technologies Inc., A Division of ATP.
(Continued)

*Primary Examiner* — Aaron L Troost
(74) *Attorney, Agent, or Firm* — Bookoff McAndrews, PLLC

(57) ABSTRACT

A processor-implemented method for automatically creating aircraft maintenance records and work logs during aircraft maintenance operations is disclosed. The method comprises retrieving, using a processor, fault data, testing data, maintenance data, and status data regarding line replaceable units (LRUs) on an aircraft via a central maintenance computer (CMC) on the aircraft; automatically collecting from a remote terminal on the aircraft data regarding maintenance operations performed using the remote terminal; automatically recording, by the processor, in a maintenance database the fault data, testing data, maintenance data, status data, and data regarding maintenance operations performed using the remote terminal; and automatically populating, by the processor using data in the maintenance database, information in a plurality of fields in a maintenance work log.

20 Claims, 4 Drawing Sheets

(51) Int. Cl.
G06F 16/248 (2019.01)
G07C 5/08 (2006.01)
G06Q 10/06 (2012.01)

(52) U.S. Cl.
CPC .............. *G07C 5/08* (2013.01); *G07C 5/085* (2013.01); *G07C 5/0808* (2013.01)

(56) References Cited

U.S. PATENT DOCUMENTS

| | | | |
|---|---|---|---|
| 6,816,762 B2 | 11/2004 | Hensey et al. | |
| 6,885,921 B1 | 4/2005 | Farmer | |
| 8,198,986 B2 | 6/2012 | Craik | |
| 9,479,388 B2 | 10/2016 | Castel et al. | |
| 2004/0078231 A1* | 4/2004 | Wilkes | G06Q 10/10 705/2 |
| 2005/0055239 A1* | 3/2005 | Farmer | G06Q 30/0601 705/7.11 |
| 2005/0149238 A1* | 7/2005 | Stefani | G08G 5/0021 701/33.4 |
| 2009/0164490 A1* | 6/2009 | Wininger | G06Q 10/06 |
| 2009/0254403 A1* | 10/2009 | Nagalla | G06Q 10/06 705/7.38 |
| 2010/0312420 A1 | 12/2010 | Sham et al. | |
| 2013/0166135 A1* | 6/2013 | Dunsdon | B64F 5/60 701/29.3 |
| 2014/0018976 A1 | 1/2014 | Goossen et al. | |
| 2016/0083118 A1 | 3/2016 | Mahalingaiah et al. | |
| 2016/0189440 A1* | 6/2016 | Cattone | G07C 5/008 701/31.5 |
| 2016/0200455 A1* | 7/2016 | Gadgil | G06F 9/44505 701/14 |
| 2016/0257429 A1* | 9/2016 | Szeto | G05B 13/026 |
| 2019/0354939 A1* | 11/2019 | Song | G06Q 50/30 |

OTHER PUBLICATIONS

Guidance for Acceptance of Electronic Aircraft Maintenance Records (EAMR) (To be incorporated in the Airworthiness Manual Doc 9760 in the 2018 publication) unedited version—Nov. 2017.

Ramsey, J.; Special Report: Avoiding NFF, Rotor&Wing International; Aug. 1, 2005.

* cited by examiner

SYSTEM AND METHOD TO AUTO CREATE AIRCRAFT MAINTENANCE RECORDS BY AIRCRAFT DATA

TECHNICAL FIELD

The technology described in this patent document relates generally to aircraft maintenance systems and more particularly to aircraft maintenance systems for automatically recording maintenance actions and creating aircraft maintenance records.

BACKGROUND

Documenting aircraft maintenance activities is necessary even though the time available for maintenance personnel to document their maintenance activities may be limited. Often documenting is done later when the maintenance personnel are back in their office, and are typically performed manually. This may lead to important information not being included in maintenance records.

Hence, it is desirable to provide systems and methods for automatically recording maintenance actions. Furthermore, other desirable features and characteristics of the present disclosure will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A processor-implemented method for automatically creating aircraft maintenance records and work logs during aircraft maintenance operations is disclosed. The method includes retrieving, using a processor, fault data, testing data, maintenance data, and status data regarding line replaceable units (LRUs) on an aircraft via a central maintenance computer (CMC) on the aircraft; automatically collecting from a remote terminal on the aircraft data regarding maintenance operations performed using the remote terminal; automatically recording, by the processor in a maintenance database, the fault data, testing data, maintenance data, status data, and data regarding maintenance operations performed using the remote terminal; and automatically populating, by the processor using data in the maintenance database, information in a plurality of fields in a maintenance work log.

A maintenance record creation module configured to automatically create aircraft maintenance records and work logs during aircraft maintenance operations is disclosed. The maintenance record creation module includes one or more processors on an aircraft configured by programming instructions on non-transient computer readable media. The maintenance record creation module is configured to retrieve fault data, testing data, maintenance data, and status data regarding line replaceable units (LRUs) on an aircraft via a central maintenance computer (CMC) on the aircraft; automatically collect, from a remote terminal on the aircraft, data regarding maintenance operations performed using the remote terminal; automatically record, in a maintenance database, the fault data, testing data, maintenance data, status data, and data regarding maintenance operations performed using the remote terminal; and automatically populate, using data in the maintenance database, information in a plurality of fields in a maintenance work log.

An aircraft equipped with a maintenance system configured to automatically create aircraft maintenance records and work logs during aircraft maintenance operations is disclosed. The aircraft includes a plurality of line replaceable units (LRUs), a central maintenance computer (CMC) configured to communicate with the LRUs via an avionics system communication bus, and a remote terminal on the aircraft. The remote terminal is configured to: retrieve fault data, testing data, maintenance data, and status data regarding the LRUs via the CMC; automatically collect data regarding maintenance operations performed using the remote terminal; automatically record in a maintenance database the fault data, testing data, maintenance data, status data, and data regarding maintenance operations performed using the remote terminal; automatically populate, using data in the maintenance database, information in a plurality of fields in a maintenance work log; automatically generate a report identifying data recorded in the maintenance database during the performance of maintenance operations; automatically update, using data in the maintenance database, fields in a listing of life limited parts; and automatically alert a maintainer to complete certain pre-determined fields not automatically populated by the processor but mandated for completion by governing authority.

BRIEF DESCRIPTION OF THE DRAWINGS

Aspects of the present disclosure are best understood from the following detailed description when read with the accompanying figures, wherein like numerals denote like elements.

DETAILED DESCRIPTION

The subject matter described herein discloses apparatus, systems, techniques and articles for automatically creating aircraft maintenance records and work logs during aircraft maintenance operations. Additionally, subject matter described herein discloses apparatus, systems, techniques and articles for recommending steps to be performed when troubleshooting faults during maintenance operations. The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, summary, or the following detailed description.

Figure 1:
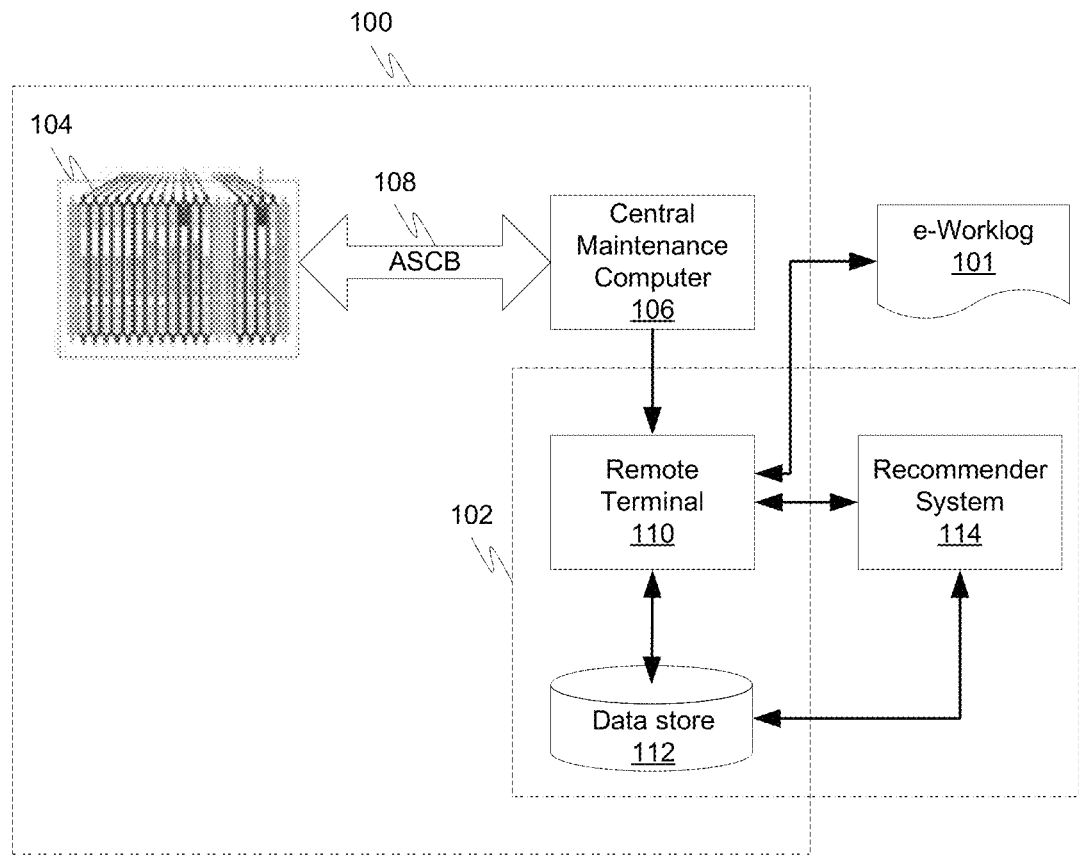
FIG. 1 is a block diagram depicting example avionics systems on an example aircraft, in accordance with some embodiments.

FIG. 1 is a block diagram depicting example avionics systems on an example aircraft 100 and a maintenance system 102 that is configured to automatically record avionics system fault information, automatically detect and record maintenance actions taken, and automatically fill fields in maintenance records 101 such as work logs. The example aircraft includes a plurality of line replaceable units (LRUs) 104 that can communicate status information to a central maintenance computer (CMC) 106 via a communication bus 108, such as an avionics system communication bus (ASCB). The example aircraft also includes a remote terminal 110 and a data store 112, both of which are part of the example maintenance system 102. The example maintenance system 102 further includes a recommender system 114 that is situated remotely from the aircraft.

The LRUs 104 in the example aircraft 100 may include various aircraft components such as an IGV actuator, a fuel module, a surge control valve, a bleed valve, a lube module, a starter/generator system, an exciter, and others. The example CMC 106 is configured to retrieve, via the ASCB 108, status information regarding the LRUs 104, such as the LRU's software/hardware part number, LRU's serial number, time and date of LRU replacement, time and date of LRU reset, and other status information.

The example remote terminal 110 may be implemented using any suitable hardware platform and is realized as a computer-implemented or computer-based device having the hardware, software, firmware, and/or processing logic needed to carry out the various techniques and methodologies described herein. The example remote terminal 110 can be used by maintenance personnel when performing maintenance actions on avionics systems (e.g., LRUs) and is configured to automatically capture LRU status information from the CMC 106, automatically record the LRU status information in the data store 112, and automatically capture and record in the data store 112 maintenance actions performed using the remote terminal 110.

The example remote terminal 110 is also configured to automatically fill entries in maintenance records commonly used in the industry such as work logs 101. The example remote terminal is configured to automatically fill pre-existing fields (e.g., industry standard fields) in the work logs 101 and automatically record on the work logs 101 detailed descriptions of troubleshooting steps performed by maintenance personnel.

The example remote terminal 110 is further configured to cooperate with the recommender system 114 in providing suggestions to maintenance personnel regarding maintenance steps to perform. The example recommender system 114 is configured for use by maintenance personnel to troubleshoot avionics faults and includes a ground-based terminal that may be implemented using any suitable hardware platform. In this regard, the ground-based terminal can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each ground-based terminal supported by the recommender system 114 is realized as a computer-implemented or computer-based device having the hardware, software, firmware, and/ or processing logic needed to carry out the various techniques and methodologies described herein.

The example recommender system 114 is configured to assist the maintenance personnel in troubleshooting the avionics faults by making suggestions based on the stored LRU status information and stored information regarding maintenance actions performed that are stored in the data store 112. The example recommender system 114 may incorporate various machine learning techniques and algorithms to form maintenance action suggestions for the maintenance personnel.

Figure 2:
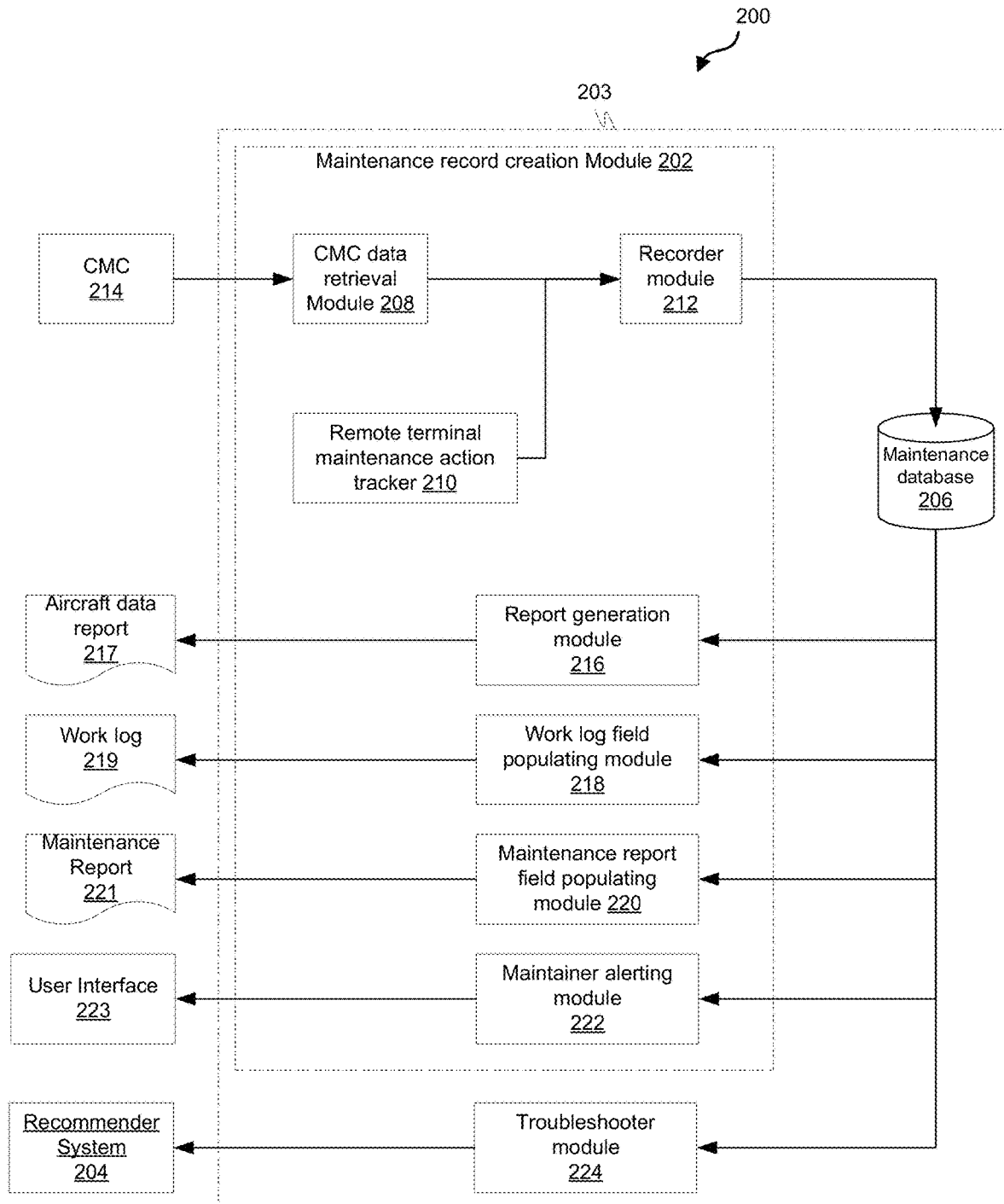
FIG. 2 is a block diagram depicting an example maintenance system, in accordance with some embodiments.

FIG. 2 is a block diagram depicting an example maintenance system 200. The example maintenance system 200 includes a maintenance record creation module 202 in a remote terminal 203 onboard an aircraft and a recommender system 204. The example maintenance record creation module 202 includes a plurality of modules configured to capture and store information regarding various avionics systems in a maintenance database 206 and a plurality of modules configured to retrieve information from the maintenance database 206 for automatically filling fields in various documents and reports. The example maintenance record creation module 202 configured to automatically create aircraft maintenance records and work logs during aircraft maintenance operations.

The example maintenance record creation module 202 may be implemented using a controller in an aircraft remote terminal. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example maintenance record creation module 202 is configured to facilitate comprehensive recording of maintenance actions performed using the remote terminal 203. In an example operating scenario, when a maintainer (e.g., maintenance personnel) commences maintenance operations the maintainer switches the aircraft to maintenance mode through a cockpit switch. The example maintenance record creation module 202 is configured to record every action performed by the maintainer through the remote terminal 203 as the maintainer traverses through different pages in the remote terminal while troubleshooting avionics faults. An example flow of operations followed by a maintainer using the remote terminal 203 includes the following:

(a) the maintainer accesses active fault pages (for active fault messages); (b) the maintainer views details of the fault(s); (c) the maintainer views member (e.g., LRU) system status for member experiencing the fault; and (d) the maintainer initiates the Built-in-test/System test for the member experiencing the fault. The example maintenance record creation module 202 is configured to capture and record the messages received and the actions taken by the maintainer. After maintenance is completed, the example maintenance record creation module 202 can automatically generate a report detailing the aircraft data recorded regarding the maintenance operations performed on the avionics units.

The example maintenance record creation module 202 is also configured to capture maintenance actions performed by examining aircraft data via an aircraft bus. Example maintenance actions that may be captured include the following: (1) the replacement of an LRU, which may be identified by examining CMC retrieved configuration data; (2) the identification of a module reset, which may be identified by monitoring aircraft data for a circuit breaker switch status or monitoring the AC/DC bus status parameters since a power cycle is associated with a module reset; (3) the identification of a CMC test performed and the results from the CMC test, which can be retrieved directly from the CMC because the CMC can maintain the history of CMC tests performed and the test results in CMC persistent storage; (4) the identification of and results received from a performed electrical check (e.g., a short test), which may be retrieved from avionics systems; and (5) the identification of and results received from a performed status test, which may be retrieved from avionics systems.

The example maintenance record creation module 202 is also configured to automatically fill certain fields in maintenance records. As an example, FAA Form 337 is used to record major repairs and major alterations made to an aircraft avionics or a component part thereof. The person who performs or supervises a major repair or major alteration is required to prepare FAA Form 337. The example maintenance record creation module 202 is configured to automatically fill certain fields in FAA Form 337. The example maintenance record creation module 202 is also configured to automatically fill certain fields in other maintenance records such as work logs. The example fields that may be auto filled include: part number, serial number, description, and time in service. The example maintenance record creation module 202 is configured to record part number and serial number information retrieved from the CMC on the maintenance records and configured to auto fill the description field with actions performed at the remote terminal by the maintainer and captured by the module. The example maintenance record creation module 202 is further configured to retrieve the time in service information for an LRU from the CMC, which tracks the time in service for each LRU.

The example maintenance record creation module 202 is also configured to update fields in a life limited parts list. Many operators/owners maintain a separate record of life limited parts that identifies the name of the part, part number, serial number, date of installation, total time in-service, date removed, signature and certification number of the person who performed trouble-shooting. The example maintenance record creation module 202 is configured to automatically update the life limited parts list using data from work logs.

The example maintenance record creation module 202 is additionally configured to generate user alerts for alerting a user to manually fill in certain mandatory fields (e.g., FAA mandated fields) required for completing a work log. The example maintenance record creation module 202 can then provide a report which can function as the formal work log related to avionics faults troubleshooting.

The example maintenance record creation module 202 includes an aircraft data retrieval module 208, a remote terminal maintenance action tracker module 210, and a recorder module 212. The aircraft data retrieval module 208 is configured to retrieve, via the CMC 214, fault data regarding LRUs on the aircraft, LRU replacement data, LRU reset data, CMC test data, electrical check data, and LRU status data. The remote terminal maintenance action tracker module 210 is configured to track and collect data regarding maintenance actions performed by a maintainer using the remote terminal 203. The recorder module 212 is configured to record in the maintenance database 206, the data retrieved by the aircraft data retrieval module 208 and the data collected by the remote terminal maintenance action tracker module 210.

The example maintenance record creation module 202 further includes a report generator module 216, a work log field populating module 218, a maintenance report field populating module 220, and maintainer alerting module 222. The report generator module 216 is configured to automatically generate an aircraft data report 217 of the aircraft data collected and recorded in the maintenance database during maintenance operations. The work log field populating module 218 is configured to automatically populate, using the data in the maintenance database, information in a plurality of fields in a maintenance work log 219. The maintenance report field populating module 220 is configured to automatically update, using the data in the maintenance database, fields in a maintenance report 221 such as a listing of life limited parts. The maintainer alerting module 222 is configured to automatically alert a maintainer via a user interface 223 to complete certain pre-determined fields not automatically populated by the maintenance record creation module 202 but mandated for completion by governing authority.

The recommender system 204 may be implemented using a controller in an aircraft remote terminal, is configured for use by maintenance personnel to troubleshoot avionics faults, and includes a ground-based terminal that may be implemented using any suitable hardware platform. The example recommender system 204 is configured to assist the maintenance personnel in troubleshooting the avionics faults by making suggestions based on the stored LRU status information and stored information regarding maintenance actions performed that are stored in the maintenance database 206. The example recommender system 204 may incorporate various machine learning techniques and/or algorithms to form maintenance action suggestions for the maintenance personnel. A complete avionics maintenance profile for an aircraft may also be prepared using maintenance data collected over time. Further, maintenance personnel may receive insights regarding the way to resolve a fault, which may not be visible from viewing maintenance manuals. Since the example maintenance record creation module 202 is configured to record every action performed by a maintainer while troubleshooting avionics system, the example recommender system can access recorded steps and alert a maintainer to steps that may be missing from maintenance manuals.

Figure 3:
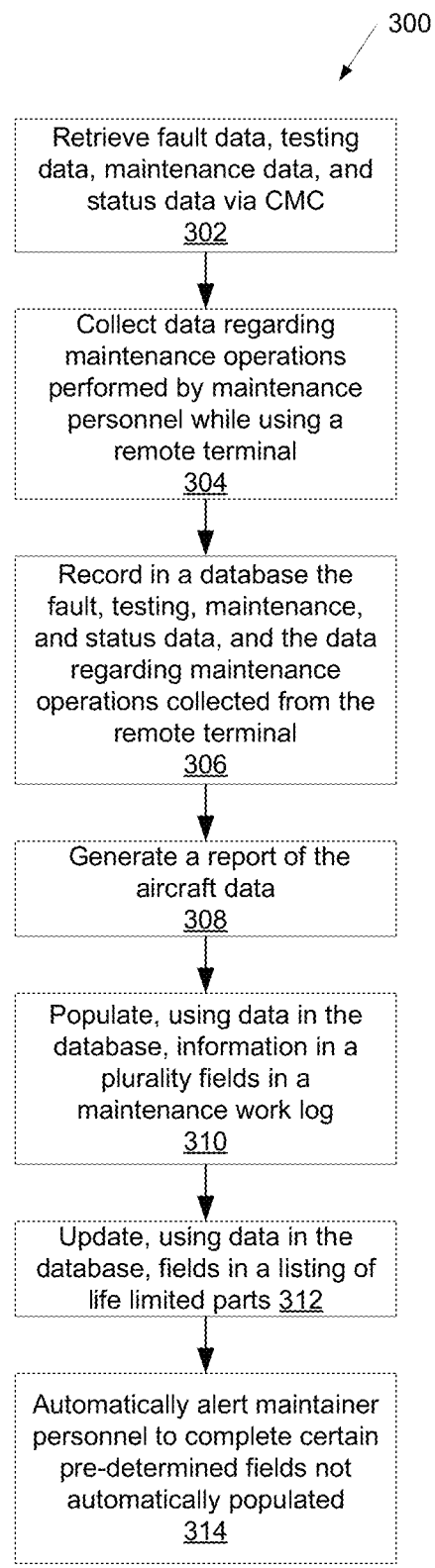
FIG. 3 is a process flow chart depicting an example process in an aircraft maintenance system for automatically creating aircraft maintenance records and work logs during aircraft maintenance operations, in accordance with some embodiments.

FIG. 3 is a process flow chart depicting an example process 300 in an aircraft maintenance system for automatically creating aircraft maintenance records and work logs during aircraft maintenance operations. The order of operation within the process is not limited to the sequential execution as illustrated in FIG. 3, but may be performed in one or more varying orders as applicable and in accordance with the present disclosure.

The example process 300 includes retrieving, via a processor on the aircraft, fault data, testing data, maintenance data, and status data regarding LRUs on the aircraft via a CMC on the aircraft (operation 302). The fault data may include fault information retrieved by the CMC regarding the LRU over the ASCB. The testing data may include the identity of any diagnostic tests performed regarding the LRU and the results from the performed diagnostic tests. The identity of diagnostic tests performed may include the identity of ASCB parameters investigated. The testing data may also include the identity of performed electrical checks and the results therefrom. The electrical checks may include tests for shorts performed by monitoring Smart and non-Smart LRU configurations. The maintenance data may include data identifying aircraft avionics system configuration changes made during the maintenance operations (e.g., whether an LRU was replaced during the maintenance operations), data identifying whether an LRU was reset during maintenance operations, and the identity of maintenance manuals referred to for troubleshooting. The status data may include data indicating the operational status of the LRU and configuration information regarding the LRU wherein the configuration information may include the software and hardware configuration of the LRU and its associated non-smart LRUs.

The example process 300 also includes automatically collecting, from a remote terminal on the aircraft, maintenance data regarding maintenance operations performed by maintenance personnel using the remote terminal (operation 304). The maintenance data may include a record of every action performed by a maintainer while using the remote terminal as the maintainer traversed through different pages presented at the remote terminal while troubleshooting avionics faults. The automatic performance of operations 302 and 304 may reduce human errors and reduce documenting workloads when maintenance actions are documented.

The example process 300 includes automatically recording in a maintenance database the fault data, testing data, maintenance data, and status data retrieved from the CMC and the maintenance data collected from the remote terminal during maintenance operations (operation 306). After completing maintenance operations, a report identifying data recorded in the maintenance database during the performance of maintenance operations can be automatically generated (operation 308).

The example process 300 includes automatically populating information in a plurality of fields in a maintenance work log (operation 310). The plurality of fields in the maintenance work log may include a part number field, a serial number field related to the part number field, a description field related to the part number field wherein the information populated in the description field includes a description of actions performed by aircraft maintainer personnel on avionics systems of the aircraft, and a time in service field related to the part number field.

The example process 300 includes automatically updating fields in a listing of life limited parts (operation 312). The life limited parts fields may include a name of a part, a part number associated with the part, a serial number associated with the part, a date of installation of the part, a total time in-service for the part, a date the part was removed, and a signature and certification number for a person performing troubleshooting regarding the part.

The example process 300 includes automatically alerting the maintainer personnel to complete certain pre-determined fields not automatically populated by the processor but mandated for completion by governing authority (operation 314). The alerting may include using an audible alert, a visual alert on a display screen, or a combination of both an audible and a visual alert.

Figure 4:
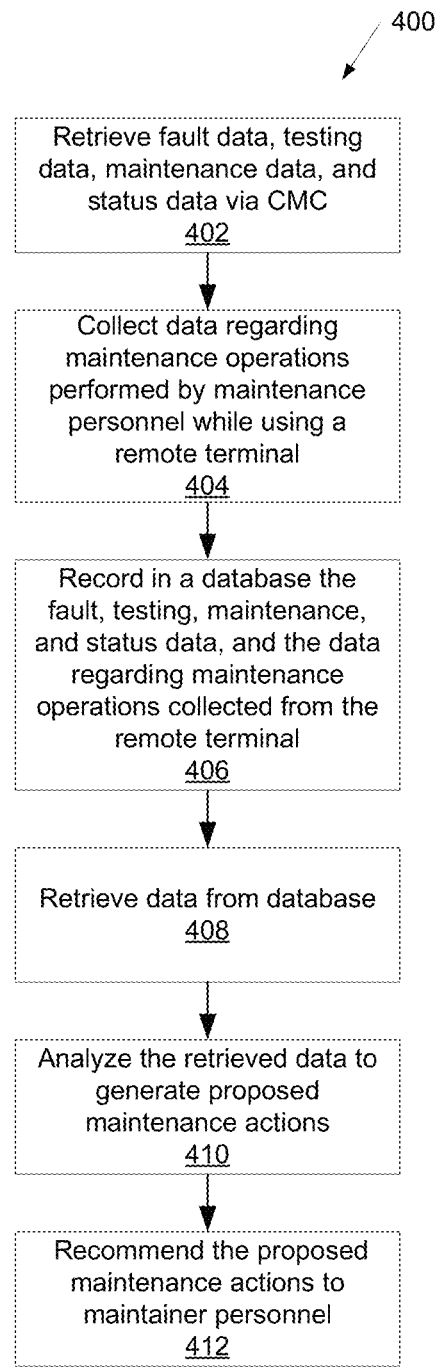
FIG. 4 is a process flow chart depicting an example process in an aircraft maintenance system for automatically recommending maintenance steps to maintenance personnel, in accordance with some embodiments.

FIG. 4 is a process flow chart depicting an example process 400 in an aircraft maintenance system for automatically recommending maintenance steps to maintenance personnel. The order of operation within the process is not limited to the sequential execution as illustrated in FIG. 4, but may be performed in one or more varying orders as applicable and in accordance with the present disclosure.

The example process 400 includes retrieving, via a processor on the aircraft, fault data, testing data, maintenance data, and status data regarding LRUs on the aircraft via a CMC on the aircraft (operation 402). The fault data may include fault information retrieved by the CMC regarding the LRU over the ASCB. The testing data may include the identity of any diagnostic tests performed regarding the LRU and the results from the performed diagnostic tests. The identity of diagnostic tests performed may include the identity of ASCB parameters investigated. The testing data may also include the identity of performed electrical checks and the results therefrom. The electrical checks may include tests for shorts performed by monitoring Smart and non-Smart LRU configurations. The maintenance data may include data identifying aircraft avionics system configuration changes made during the maintenance operations (e.g., whether an LRU was replaced during the maintenance operations), data identifying whether an LRU was reset during maintenance operations, and the identity of maintenance manuals referred to for troubleshooting. The status data may include data indicating the operational status of the LRU and configuration information regarding the LRU wherein the configuration information may include the software and hardware configuration of the LRU and its associated non-smart LRUs.

The example process 400 also includes automatically collecting, from a remote terminal on the aircraft, maintenance data regarding maintenance operations performed by maintenance personnel using the remote terminal (operation 404). The maintenance data may include a record of every action performed by a maintainer while using the remote terminal as the maintainer traversed through different pages presented at the remote terminal while troubleshooting avionics faults.

The example process 400 further includes automatically recording in a maintenance database the fault data, testing data, maintenance data, and status data retrieved from the CMC and the maintenance data collected from the remote terminal during maintenance operations (operation 406).

The example process 400 includes retrieving stored data from the maintenance database (operation 408) and analyzing the retrieved data to generate proposed maintenance actions (operation 410). Various machine learning techniques and/or algorithms may be used to analyze the data from the maintenance database to form maintenance action suggestions for maintenance personnel. Finally, the example process 400 includes recommending the proposed maintenance actions to maintainer personnel based on the analysis of the data from the maintenance database (operation 412).

Described herein are techniques that may allow for the recording of every maintenance action performed by a maintainer on avionics systems in an aircraft through comprehensive recording of maintenance actions performed by the maintainer while using a remote terminal for troubleshooting avionics faults and by capturing performed maintenance actions by reviewing aircraft data on aircraft buses. Also described herein are techniques in an aircraft maintenance system for automatically creating aircraft maintenance records and work logs during aircraft maintenance operations. Additionally, described herein are techniques in an aircraft maintenance system for recommending proposed maintenance steps for troubleshooting faults to maintenance personnel.

In one embodiment, a processor-implemented method for automatically creating aircraft maintenance records and work logs during aircraft maintenance operations is disclosed. The method comprises retrieving, using a processor, fault data, testing data, maintenance data, and status data regarding line replaceable units (LRUs) on an aircraft via a central maintenance computer (CMC) on the aircraft; automatically collecting from a remote terminal on the aircraft data regarding maintenance operations performed using the remote terminal; automatically recording, by the processor in a maintenance database, the fault data, testing data, maintenance data, status data, and data regarding maintenance operations performed using the remote terminal; and automatically populating, by the processor using data in the maintenance database, information in a plurality of fields in a maintenance work log.

These aspects and other embodiments may include one or more of the following features. The method may further comprise automatically generating, by the processor, a report identifying data recorded in the maintenance database during the performance of maintenance operations. The method may further comprise automatically updating, by the processor using data in the maintenance database, fields in a listing of life limited parts. The method may further comprise automatically alerting a maintainer to complete certain pre-determined fields not automatically populated by the processor but mandated for completion by governing authority. The method may further comprise analyzing data from the maintenance database to generate proposed maintenance actions and recommending the proposed maintenance actions to maintainer personnel. The fault data may comprise fault information retrieved by the CMC regarding at least one of the LRUs. The testing data may comprise the identity of any diagnostic tests performed regarding at least one of the LRUs and results from the performed diagnostic tests. The identity of performed diagnostic tests may comprise the identity of ASCB (avionics system communication bus) parameters investigated. The testing data may comprise data identifying performed electrical checks and the results therefrom, wherein the electrical checks comprise tests for shorts performed by monitoring smart and non-smart LRU configurations. The maintenance data may comprise data identifying aircraft avionics system configuration changes made during the maintenance operations; data identifying whether an LRU was reset during maintenance operations; and data identifying maintenance manuals referenced for troubleshooting. The status data may comprise data indicating the operational status of at least one of the LRUs and configuration information regarding at least one of the LRUs wherein the configuration information includes the software and hardware configuration of the LRU and its associated non-smart LRUs. The data regarding maintenance operations performed using the remote terminal may comprise a record of every action performed by a maintainer using the remote terminal as the maintainer traversed through different pages presented at the remote terminal while troubleshooting avionics faults. The plurality fields in a maintenance work log may comprise a part number field, a serial number field related to the part number field, a description field related to the part number field wherein the information populated in the description field includes a description of actions performed by aircraft maintainer personnel on avionics systems of the aircraft, and a time in service field related to the part number field. The life limited parts fields may comprise a name of a part, a part number associated with the part, a serial number associated with the part, a date of installation of the part, a total time in-service for the part, a date the part was removed, and a signature and certification number for a person performing troubleshooting regarding the part.

In another embodiment, a maintenance record creation module configured to automatically create aircraft maintenance records and work logs during aircraft maintenance operations is disclosed. The maintenance record creation module comprises one or more processors on an aircraft configured by programming instructions on non-transient computer readable media. The maintenance record creation module is configured to retrieve fault data, testing data, maintenance data, and status data regarding line replaceable units (LRUs) on an aircraft via a central maintenance computer (CMC) on the aircraft; automatically collect, from a remote terminal on the aircraft, data regarding maintenance operations performed using the remote terminal; automatically record, in a maintenance database, the fault data, testing data, maintenance data, status data, and data regarding maintenance operations performed using the remote terminal; and automatically populate, using data in the maintenance database, information in a plurality of fields in a maintenance work log.

These aspects and other embodiments may include one or more of the following features. The maintenance record creation module may be further configured to automatically generate a report identifying data recorded in the maintenance database during the performance of maintenance operations. The maintenance record creation module may be further configured to automatically update, using the data in the maintenance database, fields in a listing of life limited parts. The maintenance record creation module may be further configured to automatically alert a maintainer to complete certain pre-determined fields not automatically populated by the processor but mandated for completion by governing authority.

In another embodiment, an aircraft equipped with a maintenance system configured to automatically create aircraft maintenance records and work logs during aircraft maintenance operations is disclosed. The aircraft comprises a plurality of line replaceable units (LRUs), a central maintenance computer (CMC) configured to communicate with the LRUs via an avionics system communication bus, and a remote terminal on the aircraft. The remote terminal is configured to: retrieve fault data, testing data, maintenance data, and status data regarding the LRUs via the CMC; automatically collect data regarding maintenance operations performed using the remote terminal; automatically record in a maintenance database the fault data, testing data, maintenance data, status data, and data regarding maintenance operations performed using the remote terminal; automatically populate, using data in the maintenance database, information in a plurality of fields in a maintenance work log; automatically generate a report identifying data recorded in the maintenance database during the performance of maintenance operations; automatically update, using data in the maintenance database, fields in a listing of life limited parts; and automatically alert a maintainer to complete certain pre-determined fields not automatically populated by the processor but mandated for completion by governing authority.

These aspects and other embodiments may include one or more of the following features. The remote terminal may be further configured to analyze data from the maintenance database to generate proposed maintenance actions and recommend the proposed maintenance actions to maintainer personnel.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention if such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. As an example, in other embodiments the example processes 200, 300, 400, and 500 may be performed by an engine-mounted communication module. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A processor-implemented method for automatically creating aircraft maintenance records and work logs during aircraft maintenance operations, the method comprising:

automatically retrieving, using a processor, fault data, testing data, maintenance data, and status data regarding line replaceable units (LRUs) on an aircraft via a central maintenance computer (CMC) on the aircraft;

automatically collecting, from a remote terminal on the aircraft, data regarding maintenance operations performed using the remote terminal, wherein the data regarding maintenance operations performed includes a record of actions performed using the remote terminal to troubleshoot avionics faults;

automatically recording, by the processor in a maintenance database, (1) the fault data, testing data, maintenance data, and status data automatically retrieved from the CMC of the aircraft, and (2) data regarding maintenance operations performed using the remote terminal; and automatically populating, by the processor using data in the maintenance database, a plurality of fields in a maintenance work log with automatically collected data regarding one or more actions performed using the remote terminal to troubleshoot avionics faults.

2. The method of claim 1, further comprising:
automatically generating, by the processor, a report identifying data recorded in the maintenance database during the aircraft maintenance operations.

3. The method of claim 1, further comprising:
automatically updating, by the processor using data in the maintenance database, fields in a listing of life limited parts.

4. The method of claim 3, wherein the fields in the listing of life limited parts comprise:
a name of a part, a part number associated with the part, a serial number associated with the part, a date of installation of the part, a total time in-service for the part, a date the part was removed, and a signature and certification number associated with performing troubleshooting operations on the part.

5. The method of claim 1, further comprising:
automatically alerting the remote terminal to complete certain pre-determined fields not automatically populated by the processor but mandated for completion by governing authority.

6. The method of claim 1, further comprising:
analyzing data from the maintenance database to generate proposed maintenance actions; and
recommending the proposed maintenance actions to the remote terminal.

7. The method of claim 1, wherein the fault data comprises:
fault information retrieved by the CMC regarding at least one of the LRUs.

8. The method of claim 1, wherein the testing data comprises:
the identity of any diagnostic tests performed regarding at least one of the LRUs; and
results from the performed diagnostic tests.

9. The method of claim 8, wherein the identity of performed diagnostic tests comprises:
the identity of avionics system communication bus (ASCB) parameters investigated.

10. The method of claim 8, wherein the testing data further comprises data identifying performed electrical checks and the results therefrom, wherein the electrical checks comprise tests for shorts performed by monitoring smart and non-smart LRU configurations.

11. The method of claim 1, wherein the maintenance data comprises:
data identifying aircraft avionics system configuration changes made during the maintenance operations;
data identifying whether an LRU was reset during maintenance operations; and
data identifying maintenance manuals referenced for troubleshooting.

12. The method of claim 1, wherein the status data comprises:
data indicating the operational status of at least one of the LRUs and configuration information regarding at least one of the LRUs wherein the configuration information includes the software and hardware configuration of the LRU and its associated non-smart LRUs.

13. The method of claim 1, wherein the data regarding maintenance operations performed using the remote terminal comprises a record of every action performed using the remote terminal as different pages presented at the remote terminal while troubleshooting avionics faults are traversed.

14. The method of claim 1, wherein the plurality of fields in the maintenance work log comprises:
a part number field, a serial number field related to the part number field, a description field related to the part number field, wherein the information populated in the description field includes a description of actions performed using the remote terminal, and a time in service field related to the part number field.

15. A controller for automatically creating aircraft maintenance records and work logs during aircraft maintenance operations, the controller configured to:
automatically retrieve fault data, testing data, maintenance data, and status data regarding line replaceable units (LRUs) on an aircraft via a central maintenance computer (CMC) on the aircraft;
automatically collect, from a remote terminal on the aircraft, data regarding maintenance operations performed using the remote terminal, the data regarding maintenance operations performed including a record of actions performed using the remote terminal troubleshoot avionics faults;
automatically record, in a maintenance database, (1) the fault data, testing data, maintenance data, and status data automatically retrieved from the CMC of the aircraft, and (2) data regarding maintenance operations performed using the remote terminal; and
automatically populate, using data in the maintenance database, a plurality of fields in a maintenance work log with automatically collected data regarding maintenance operations performed using the remote terminal.

16. The controller of claim 15, further configured to:
automatically generate a report identifying data recorded in the maintenance database during the aircraft maintenance operations.

17. The controller of claim 15, further configured to:
automatically update, using the data in the maintenance database, fields in a listing of life limited parts.

18. The controller of claim 15, further configured to:
automatically alert the remote terminal to complete certain pre-determined fields not automatically populated by the controller but mandated for completion by governing authority.

19. An aircraft equipped with a maintenance system configured to automatically create aircraft maintenance records and work logs during aircraft maintenance operations, the aircraft comprising:
a plurality of line replaceable units (LRUs);
a central maintenance computer (CMC) configured to communicate with the LRUs via an avionics system communication bus; and
a remote terminal on the aircraft configured to:
automatically retrieve fault data, testing data, maintenance data, and status data regarding the LRUs via the CMC;
automatically collect data regarding maintenance operations performed using the remote terminal, the data regarding maintenance operations performed including a record of actions performed using the remote terminal to troubleshoot avionics faults;
automatically record in a maintenance database, (1) the fault data, testing data, maintenance data, and status data, and (2) data regarding maintenance operations performed using the remote terminal;
automatically populate, using data in the maintenance database, a plurality of fields in a maintenance work log with automatically collected data regarding maintenance operations performed using the remote terminal;

automatically generate a report identifying data recorded in the maintenance database during the aircraft maintenance operations;

automatically update, using data in the maintenance database, fields in a listing of life limited parts; and automatically alert the remote terminal to complete certain pre-determined fields not automatically populated by the processor but mandated for completion by governing authority.

20. The aircraft of claim 19, wherein the remote terminal is further configured to:

analyze data from the maintenance database to generate proposed maintenance actions; and recommend the proposed maintenance actions to the remote terminal.

* * * * *